United States Patent

Kunzle

[11] 4,037,863
[45] July 26, 1977

[54] QUICK COUPLING DEVICE

[75] Inventor: Othello Kunzle, Gossau, Switzerland

[73] Assignee: Elex A.G., Zurich, Switzerland

[21] Appl. No.: 684,754

[22] Filed: May 10, 1976

[51] Int. Cl.² .................................... F16L 39/00
[52] U.S. Cl. .................................. 285/320; 285/364; 403/338
[58] Field of Search ............... 285/81, 308, 309, 310, 285/311, 112, 313, 320, 364; 24/251; 403/342, 338

[56] References Cited

U.S. PATENT DOCUMENTS

| | | | |
|---|---|---|---|
| 1,893,979 | 1/1933 | Barrere | 285/313 X |
| 1,966,718 | 7/1934 | Hanson | 285/313 |
| 2,643,139 | 6/1953 | Hamilton | 285/309 X |

Primary Examiner—Dave W. Arola

[57] ABSTRACT

A quick coupling device for maintaining in axial flow-through alignment a first flow-through member with a second flow-through member, the first member having clamping means attached thereto coacting with a flange means of the second member to provide a sealing relationship between the first and second members.

6 Claims, 2 Drawing Figures

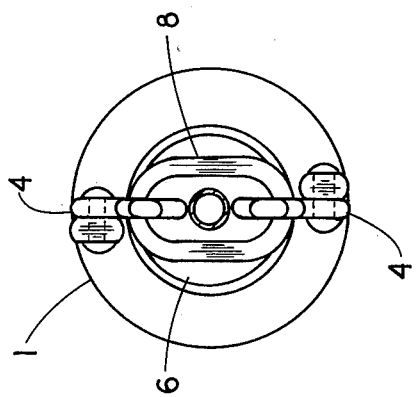
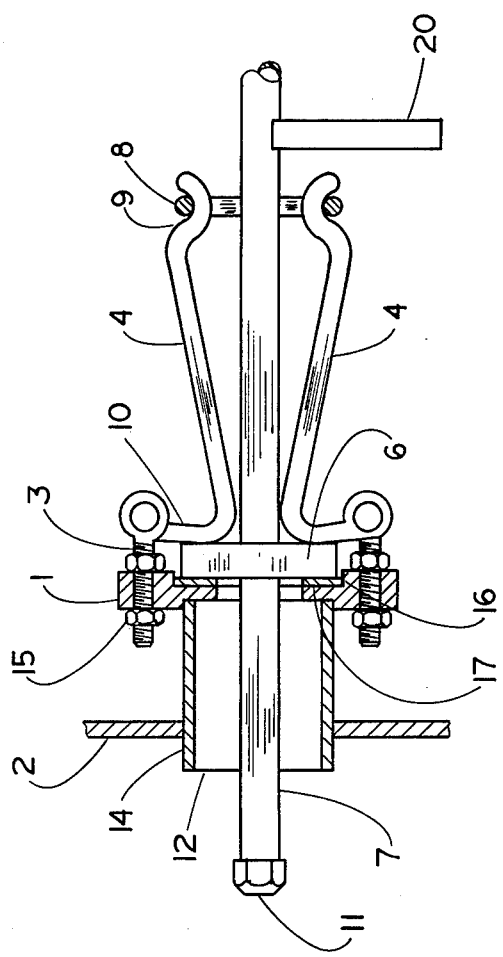

4,037,863

QUICK COUPLING DEVICE

BACKGROUND OF THE INVENTION

The present invention relates to certain new and useful improvements in quick coupling devices in a fluid flow system and more particularly relates to a quick coupling device with means for holding in axial flow-through alignment a first flow-through member with a second flow-through member.

In most arrangements for making connections in a fluid system between two conduits, flange connections are used. And, where the connection must be disconnected and reconnected at frequent intervals, many different types of connecting flange devices have been suggested.

For example, in cooling towers utilizing a plurality of water spray nozzles which extend through the sidewalls of the tower, water is continuously injected through spray nozzles. The spray nozzles are placed at the end of water feeding pipes and are generally evenly distributed around the circumference of the tower shell. Contamination of the water with dust in the gas to be cooled often causes the choking or clogging of the nozzles. Therefore, they must be checked and cleaned or replaced periodically. The replacement is generally done by making a connection between the feed pipe and the spray nozzles at a point outside the shell of the cooling tower. The most common solution for these pipe connections has been the utilization of two flanges which are in alignment with bolts circumferentially surrounding the flanges holding the two flanges in a sealing relationship. However, in making the connections, not only is there considerable time involved in removing the bolts from the flanges, but the bolt threads are easily damaged and many times a bolt or nut is dropped or lost, therefore making spare parts available a must.

Another solution which has been suggested is the mounting of two opposed knobs on a fixed flange or on the wall where a loose flange is to be attached, the knobs overlapping the loose flange. After placing the loose flange onto the fixed flange, a wedge is then driven under each knob thus pressing the flanges together. The wedges can be secured to the fixed flange by means of chains or other comparable means. However, for the connection or disconnection of the two flanges, a hammer is generally required. In addition, the wedges are not always placed correctly and the chains or similar means for holding the wedges to the fixed flange are often damaged thereby loosening the wedges.

SUMMARY OF THE INVENTION

In the present invention, it is recognized that it is desirable to provide a quick coupling device for coupling in axial alignment two flow-through members which is inexpensive, yet provides for a fluid tight seal. Furthermore, it is recognized that it is desirable to provide a quick coupling device which is easily constructed and easily and quickly operable. Also, it is recognized that it is desirable to provide a quick coupling device including movable clamping means fixedly attached to one of the members whereby said clamping means is retained thereon.

The present invention advantageously provides a straightforward arrangement for a quick coupling device specifically useful for nozzle feeding pipe for water injection into a cooling tower. The present invention further provides a quick coupling device including quick disconnect clamping means that is inexpensive, sturdy, easy and quickly operable, and yet in combination with two conduits having facing flanges thereon with axially aligned openings therethrough, provides a fluid tight seal. The present invention even further provides a quick coupling device including fixedly attached movable clamping means.

Various other features of the present invention will become obvious to those skilled in the art upon reading the dislcosure set forth hereinafter.

More particularly, the present invention provides a quick coupling device for connecting a feed member to a housing member comprising: clamping means movably connected to one of the members and flange means fixedly connected to the other of the members to be engaged by the clamping means to hold the feed member in set position.

It is to be understood that the description of the examples of the present invention given hereinafter are not by way of limitation and various modifications within the scope of the present invention will occur to those skilled in the art upon reading the disclosure set forth hereinafter.

Referring to the drawing:

FIG. 1 is a sectional-elevational view of one preferred quick coupling device of the present invention; and, FIG. 2 is a sectional-end view of the quick coupling device of the present invention as shown in FIG. 1.

In the Figures, an example of the quick coupling device of the present invention is shown when utilized for quick removal of a nozzle feeding pipe in a cooling tower.

The housing 2 of a cooling tower includes an opening 12 therein with a conduit 14 fixedly attached to the housing 2 and extends through the opening 12 to receive in coaxial alignment a feeding pipe 7 therethrough with a spray nozzle 11 on the end thereof. A flange 1 is provided on the outwardly extending portion of the conduit 14, the flange 1 having an opening in the center thereof in coaxial alignment with the opening in the conduit 14 to receive the conduit feeding pipe 7 therethrough.

A pair of eye bolts 3 with nuts 15 thereon are affixed on opposed sides of the flange 1, the eye bolts 3 being turned so that their planes normal to the central axis of the eye openings therethrough are in substantially parallel alignment. Hingedly attached to the eye bolts 3 are the shorter legs or base 10 of a pair of clamping means, shown as L-shaped spring clips 4, the spring clips 4 being hinged to swing normal to the longitudinal axis of pipe 7.

The feeding pipe 7 includes a flange 6 thereon a preselected distance from the end of the pipe 7 wherein the flange 6 is received by a recess 16 in the flange 1, the recess 16 having a diameter at least equal to the outer diameter of the flange 6. Also, a gasket 17 may be utilized between the flange 1 and the flange 6, the gasket 17 being disposed within the recess 16 to provide a seal therebetween.

The L-shaped spring clips 4, which are generally bent at an angle from 60° to 85°, are provided with grooves 9 at the outer extremity thereof to receive in nesting relation therein a tension member 8, the tension member 8 being an oval or ring shaped member which holds the springs clips 4 under tension with the base 10 of the spring clips 4 bearing against a face of the flange 6 opposed to the face received by the recess 16. Generally, flange 6 has a diameter greater than the tension member 8, thereby retaining tension member 8 onto feeding pipe 7. Feeding pipe 7 may also include a stop member 20 thereon at a preselected position to retain tension member 8 within a preselected area, member 8 being retained between flange 6 and stop member 20. Stop member 20, as shown, is a flat member welded to pipe 7 and extends outwardly therefrom a distance greater than the diameter of the member 8.

In the operation of the quick coupling device of the present invention, to remove the feed pipe 7 which includes the spray nozzle 11 attached thereto, the spring clips 4 are pressed together simultaneously, generally by hand, with the tension member 8 being removed therefrom. The spring clips 4 are then totally open and the feed pipe 7 is then removed. For the reconnection of the feed pipe, the reverse procedure is generally followed; that is, the flange 6 is placed within the recess 16 of the flange 1 with the feed pipe 7 extending through the opening 12 in the housing 2. The spring clips 4 are simultaneously pressed together by hand with the tension member 8 being placed thereon in nesting relation in the groove 9.

It will be realized that various changes may be made to the specific embodiment shown and described without departing from the principles of the present invention.

What is claimed is:

1. A quick coupling device for connecting a feed member to a housing member comprising: clamping means including a pair of opposed spring clips with a groove at the outer extremity thereof movably connected to one of said members and flange means fixedly connected to the other of said members to be engaged by said clamping means, said clamping means including a ring member engageable with said groove in nesting relation therein to hold said clamping means in clamped position against said flange means whereby said members are clamped against relative movement when said feed member and housing member are in assembled relationship, said other member including said flange means having stop means thereon, said ring member disposed between said stop means and said flange means, said stop means and said flange means being sized to retain said ring member therebetween.

2. The quick coupling device of claim 1, said spring clips being of substantially L-shaped configuration having one end hingedly attached to said one of said members with the opposed end extending outwardly from said member.

3. The quick coupling device of claim 2, said L-shaped spring clips being bent at an angle of from about 60° to 85°.

4. The quick coupling device of claim 1, said housing member including a wall with an opening therein and a conduit member extending outwardly therefrom, said conduit member including a flange on its outer portion, said flange having said clamping means attached thereto.

5. The quick coupling device of claim 1, said feed member being a conduit with one end thereof extending through in coaxial alignment with an opening in said housing member.

6. The quick coupling device of claim 5, said one end of said conduit including a nozzle on the end thereof.

* * * * *